United States Patent
Biskeborn

(10) Patent No.: US 6,760,199 B2
(45) Date of Patent: Jul. 6, 2004

(54) READ/WRITE HEAD ASSEMBLY EMPLOYING INDEPENDENT READ/WRITE SHIELD-PAIRING AND CHARGE-CLAMPED MAGNETORESISTIVE SENSORS

(75) Inventor: Robert Glenn Biskeborn, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 91 days.

(21) Appl. No.: 09/911,555

(22) Filed: Jul. 23, 2001

(65) Prior Publication Data

US 2003/0016474 A1 Jan. 23, 2003

(51) Int. Cl.$^7$ .............................. G11B 5/127; G11B 5/33
(52) U.S. Cl. ........................................ 360/323; 360/319
(58) Field of Search .................. 360/319, 327.21, 360/327.24, 322, 320, 323, 327.33, 327.23, 318.1, 318

(56) References Cited

U.S. PATENT DOCUMENTS

| | | | |
|---|---|---|---|
| 4,170,033 A | 10/1979 | Ridgway et al. | 360/121 |
| 4,623,867 A * | 11/1986 | Lundquist et al. | 338/32 R |
| 4,972,286 A | 11/1990 | Jurisch et al. | 360/126 |
| 5,142,425 A | 8/1992 | Gailbreath, Jr. et al. | 360/123 |
| 5,247,413 A | 9/1993 | Shibata et al. | 360/113 |
| 5,272,582 A | 12/1993 | Shibata et al. | 360/113 |
| 5,491,600 A * | 2/1996 | Chen et al. | 360/322 |
| 5,491,605 A | 2/1996 | Hughbanks et al. | 360/113 |
| 5,539,598 A * | 7/1996 | Denison et al. | 360/323 |
| 5,557,492 A * | 9/1996 | Gill et al. | 360/319 |
| 5,663,856 A | 9/1997 | Packard | 360/122 |
| 5,757,591 A * | 5/1998 | Carr et al. | 360/323 |
| 5,761,009 A | 6/1998 | Hughbanks et al. | 360/113 |
| 5,764,446 A * | 6/1998 | Seagle | 360/322 |
| 5,829,702 A * | 11/1998 | Zweighaft | 242/334.6 |
| 5,850,324 A * | 12/1998 | Wu et al. | 360/322 |
| 5,978,181 A | 11/1999 | Niijima et al. | 360/113 |
| 6,081,409 A | 6/2000 | Hughbanks et al. | 360/128 |
| 6,160,688 A | 12/2000 | Okumura | 360/323 |
| 6,330,123 B1 * | 12/2001 | Schwarz et al. | 360/75 |

FOREIGN PATENT DOCUMENTS

| | | |
|---|---|---|
| EP | 0634739 A2 | 1/1995 |
| JP | 06215321 | 8/1994 |
| JP | 10055518 | 2/1998 |

OTHER PUBLICATIONS

T. A. Schwarz, "Perpendicular Read/Write Head With High Reluctance Leg", *IBM Technical Disclosure Bulletin*, vol. 24, No. 4, Sep. 1981.

* cited by examiner

*Primary Examiner*—Brian E. Miller
(74) *Attorney, Agent, or Firm*—Ervin F. Johnston

(57) ABSTRACT

A magnetic head assembly with an air bearing surface (ABS) layer over a double-shielded magnetoresistive (MR) sensor and a write gap formed between two spaced magnetic pole tips, with an optional write-gap shield disposed so that one magnetic pole tip is disposed between the write-gap shield and the other magnetic pole tip. At least one of the MR element shields is electrically connected to one of the MR signal lead conductors (preferably the one having the most positive potential) and the one magnetic pole tip (and/or the optional write-gap shield) is coupled to the clamped MR element shield with an electrical conductor. For multi-track read/write arrays, the connection between adjacent reader shield and writer pole and/or shield is provided independently for each read/write pair in the array, thereby equalizing the voltage environments to reduce variations in the chemical/mechanical erosion of the read and write head ABS layers.

12 Claims, 4 Drawing Sheets

READ/WRITE HEAD ASSEMBLY EMPLOYING INDEPENDENT READ/WRITE SHIELD-PAIRING AND CHARGE-CLAMPED MAGNETORESISTIVE SENSORS

BACKGROUND OF THE INVENTION

1. Field of the Invention

This invention relates generally to read/write head arrays for magnetic data stores and more particularly to a read/write shield-pairing technique for optimizing head surface wear.

2. Description of the Prior Art

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in tens of gigabytes on 256 data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM corporation. The MR sensor transduces magnetic field changes in a MR stripe to resistance changes, which are processed to provide digital signals. Data storage density can be increased because a MR sensor offers signal levels higher than those available from conventional inductive read heads for a given bit area. Moreover, the MR sensor output signal depends only on the instantaneous magnetic field intensity in the storage medium and is independent of the magnetic field time-rate-of-change arising from relative sensor/medium velocity.

The quantity of data stored on a magnetic tape may be increased by increasing the number of data tracks on the tape, which also decreases the distance between adjacent tracks and forces adjacent read/write heads closer together. More tracks are made possible by reducing feature sizes of the read and write elements, such as by using thin-film fabrication techniques and MR sensors. In operation the magnetic storage medium, such as tape or a magnetic disk surface, is passed over the magnetic read/write (R/W) head assembly for reading data therefrom and writing data thereto. In modern magnetic tape recorders adapted for computer data storage, read-while-write capability with MR sensors is an essential feature for providing fully recoverable magnetically stored data. The interleaved R/W magnetic tape head with MR sensors allows increased track density on the tape medium while providing bi-directional read-while-write operation of the tape medium to give immediate read back verification of data just written onto the tape medium. A read-while-write head assembly includes, for each of one or more data tracks, a write element in-line with a read element, herein denominated a AR/W trackpair,@ wherein the gap of the read element is closely-disposed to and aligned with the gap of the write element, with the read element positioned downstream of the write element in the direction of medium motion. By continually reading Ajust recorded@ data, the quality of the recorded data is immediately verified while the original data is still available in temporary storage in the recording system. The recovered data is compared to the original data to afford opportunity for action, such as re-recording, to correct errors. In the interleaved head, the R/W track-pairs are interleaved to form two-rows of alternating read and write elements. Alternate columns (track-pairs) are thereby disposed to read-after-write in alternate directions of tape medium motion. Tape heads suitable for reading and writing on high-density tapes also require precise alignment of the track-pair elements in the head assembly.

Tape heads in particular suffer from head wear caused by motion of the magnetic recording tape. Repeated passes of the tape medium over the wear-resistant tape head surface may eventually wear away some of the surface, which can impair head performance. This may be a particular problem for thin-film magnetic heads where the thin-film layer structure may see relatively considerable wear with brief operation, giving an unacceptably short lifetime for the magnetic head assembly. Practitioners in the art provide very hard wear-resistant layers on the air bearing surfaces of magnetic heads to inhibit wear, for example, a sputtered layer of diamond-like carbon or titanium-carbide, but such layers are also very thin, being perhaps 20 nanometers thick.

While wear mechanisms are not perfectly understood in the art, one problem is believed to arise from accelerated wear in line with the write gap, which is disadvantageous for head-assembly life-expectancy. The wear difference is media-dependent and can be severe enough to make certain media incompatible with such head assemblies.

There is accordingly a clearly-felt need in the art for a wear-resistant interleaved read/write head assembly with improved symmetric wear characteristics. These unresolved problems and deficiencies are clearly felt in the art and are solved by this invention in the manner described below.

SUMMARY OF THE INVENTION

The purpose of this invention is to optimize head wear by equalizing the voltage environments of the read and write heads to reduce electrochemical/mechanical erosion of the wear-resistant air bearing surface (ABS) layer. This is accomplished by adding an electrical connection between adjacent electrically conductive reader shields and writer poles/shields. For thin-film multi-track read/write arrays, such connection is provided independently for each pair of read/write elements in the array.

It is a feature of this invention that a write-gap pole is provided adjacent the read gap shield. It is another feature of this invention that at least one and preferably both read gap shields is electrically-clamped to one of the MR signal leads (preferably the lead having the most positive potential) or to both MR leads via a center-tapped resister clamping structure that may be appreciated with reference to the commonly-assigned U.S. Pat. No. 6,246,553 incorporated herein by reference.

It is an advantage of this invention that a write-gap pole or shield of the type used by IBM Corporation for head manufacturability can be easily connected by a conductor to the adjacent read-gap shield.

In one aspect, the invention is a magnetic head assembly including a write gap formed between two spaced magnetic pole tips and a magnetoresistive (MR) sensor element having opposite ends each connected to a respective electrical lead conductor, the MR sensor element and the two electrical lead conductors being disposed in spaced relationship between two MR element shields, wherein the improvement includes a first electrical conductor coupling at least one of the MR element shields and at least one of the electrical lead conductors and a second electrical conductor coupling the one MR element shield and one of the write-gap poles.

In another aspect, the invention is a magnetic head assembly having an air bearing surface (ABS), including a read head having a magnetoresistive (MR) sensor element with opposite ends each connected to a respective electrical lead conductor, the MR sensor element and the two electrical lead conductors being disposed in spaced relationship between two MR element shields and a first electrical conductor coupling at least one of the MR element shields and at least one of the electrical lead conductors; a write head having two magnetic pole pieces each with a pole tip portion disposed adjacent the ABS and a write gap located between the pole tip portions; and a second electrical conductor coupling the one MR element shield and one of the write-gap poles.

In yet another aspect, the invention is a magnetic tape drive with at least one magnetic head assembly that has an air bearing surface (ABS), the tape drive including a magnetic recording medium having a recording surface, a motor for moving the magnetic recording medium, and a headmount assembly for supporting the magnetic head assembly with respect to the magnetic recording medium; where the read head includes a magnetoresistive (MR) sensor element having opposite ends each connected to a respective electrical lead conductor, the MR sensor element and the two electrical lead conductors being disposed in spaced relationship between two MR element shields and a first electrical conductor coupling at least one of the MR element shields and at least one of the electrical lead conductors; where the write head includes two magnetic pole pieces each having a pole tip portion disposed adjacent the ABS and a nonmagnetic write gap located between the pole tip portions; and a second electrical conductor coupling the one MR element shield and one of the write-gap poles.

In a further aspect, the invention is a method for making a magnetic head assembly that has an air bearing surface (ABS), including the unordered steps of (a) making a read head with the steps of forming a magnetoresistive (MR) sensor element having two ends disposed adjacent the ABS in spaced relationship between two MR element shields, forming an electrical lead conductor coupled to each MR sensor element end, and forming a first electrical conductor coupling at least one of the MR element shields and at least one of the electrical lead conductors, (b) making a write head with the steps of forming two magnetic pole pieces each having a pole tip portion disposed adjacent the ABS and forming a nonmagnetic write gap located between the pole tip portions, and (c) forming a second electrical conductor coupling the one MR element shield and one of the write-gap poles.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
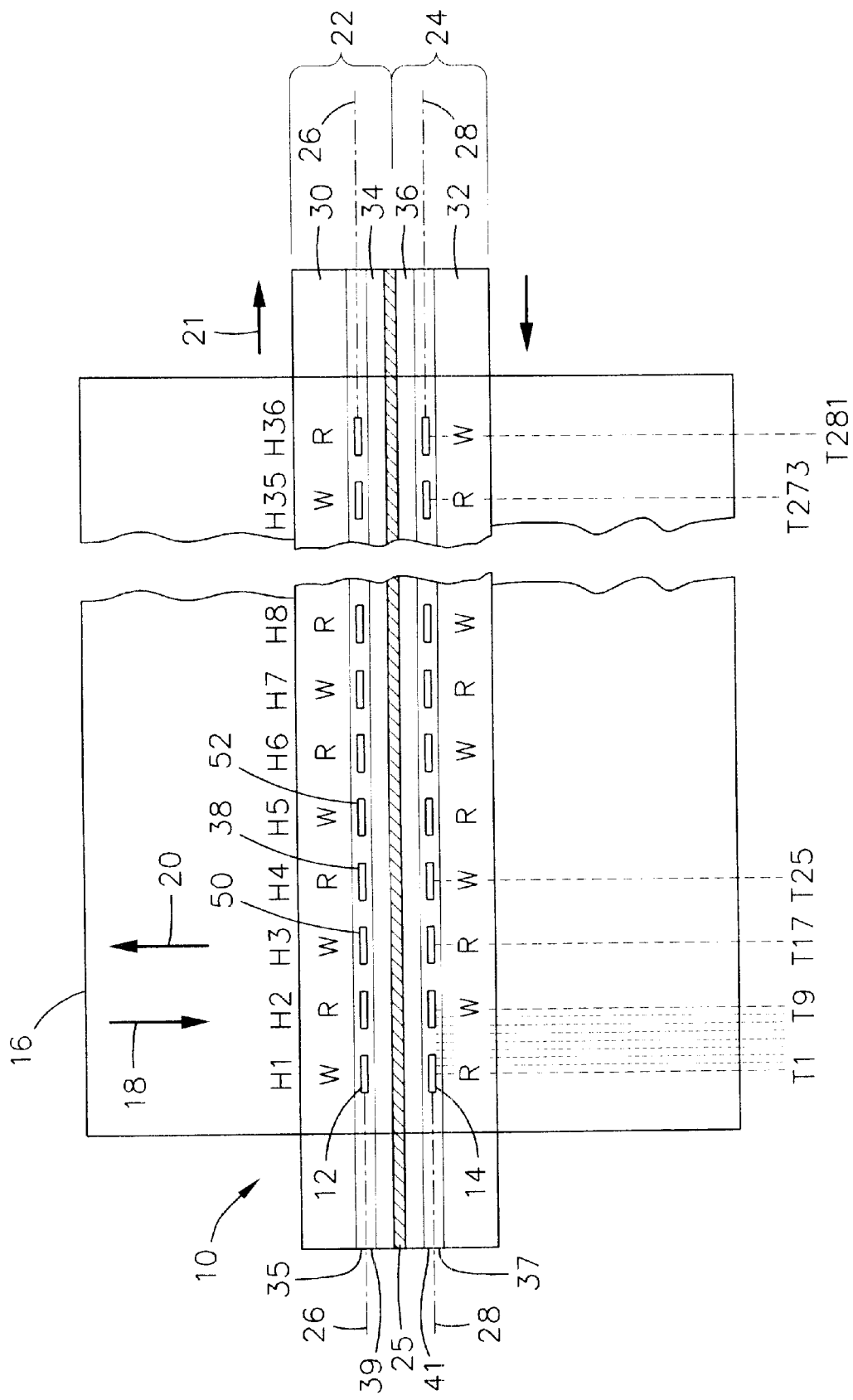
FIG. 1 illustrates a front view of the air bearing surface (ABS) of an interleaved magnetoresistive (MR) head assembly in relation to a magnetic tape storage medium.

FIG. 1 shows the air bearing surface (ABS) of a preferred embodiment an interleaved magnetoresistive (MR) head assembly 10, where the read elements are marked AR@ and the write elements are marked AW.@ The write elements, exemplified by the write head 12 and the read elements, exemplified by the read head 14, are disposed in alternating fashion to form a single set of thirty-eight (for example) read/write track-pairs, exemplified by the R/W track-pair 12–14. As used herein, the term Aalternating@ is intended to include other formats. For example, one format provides that the odd-numbered heads H1, H3, H5 etc. are operative during forward tape movement, while the even-numbered heads H2, H4, H6 etc. are operative during the opposite direction of tape movement.

Generally, the length of the magnetic tape medium 16 moves in either a forward or reverse direction as indicated by the arrows 18 and 20. Head assembly 10 is shown in FIG. 1 as if magnetic tape medium 16 were transparent, although such tape medium normally is not transparent. Arrow 18 designates a forward movement of tape medium 16 and arrow 20 designates a reverse direction. Magnetic tape medium 16 and interleaved MR head assembly 10 operate in a transducing relationship in the manner well-known in the art. Other formats usable in the practice of this invention are considered to be within the teaching of this invention.

Each of the head elements in head assembly 10 is intended to operate over a plurality of data tracks in magnetic tape medium 16, as may be appreciated with reference to the data tracks T1, T9, T17, etc. in FIG. 1, which shows an exemplary 288-track scheme having a data track density on magnetic tape medium 16 of eight times the recording element density of R/W track-pairs H1, H2, . . . H36 in MR head assembly 10. Tracks T9, T25, . . . T281 may be written with one pass of magnetic tape medium 16 in direction 18 over even-numbered R/W track-pairs H2, H4, . . . H36 and then tracks T1, T17, . . . T273 written on a return pass of magnetic tape medium 16 over the odd-numbered R/W track-pairs H1, H3, . . . H35 by moving the lateral position of MR head assembly 10 in the direction of the arrow 21 by a distance equivalent to one track pitch (T1–T2), which is about 12% of the R/W track-pair spacing (H1–H2).

Interleaved MR head assembly 10 includes two thin-film modules 22 and 24 of generally identical construction.

Modules 22 and 24 are joined together with adhesive layer 25 to form a single physical unit, wherein the R/W track-pairs H1, H2, . . . H36 are aligned as precisely as possible in the direction of tape medium movement. Each module 22, 24 includes one head-gap line 26, 28, respectively, where the individual R/W gaps, exemplified by write head 12 and read head 14, in each module are precisely located. Each thin-film module 22, 24 includes a separate substrate 30, 32 and a separate closure piece 34, 36, respectively. Substrate 30 is bonded near head-gap line 26 by adhesive to closure piece 34 to form thin-film module 22 and substrate 32 is bonded near head-gap line 28 by adhesive to closure piece 36 to form thin-film module 24. An underlayer (35, 37) may be deposited on the substrate (30, 32) before formation of the R/W heads and an overlayer (39, 41) is deposited over the R/W heads before placement of the closure piece (34, 36), substantially as shown. As precisely as possible, head-gap lines 26, 28 are disposed perpendicular to the directions of tape medium movement as represented by arrows 18,20. The R/W head-gaps at H1–H36 in thin-film module 22 cooperate with the corresponding R/W head-gaps in thin-film module 24 to provide read-after-write functionality during movement of magnetic tape medium 16. The read head gaps of one thin-film module are precisely aligned with the write head gaps of the other module along the direction of movement of tape medium 16. Thus, for example, write head 12 is aligned with read head 14 to form a single R/W track-pair H1 for read-after-write during magnetic tape movement in the direction indicated by arrow 18.

Figure 2:
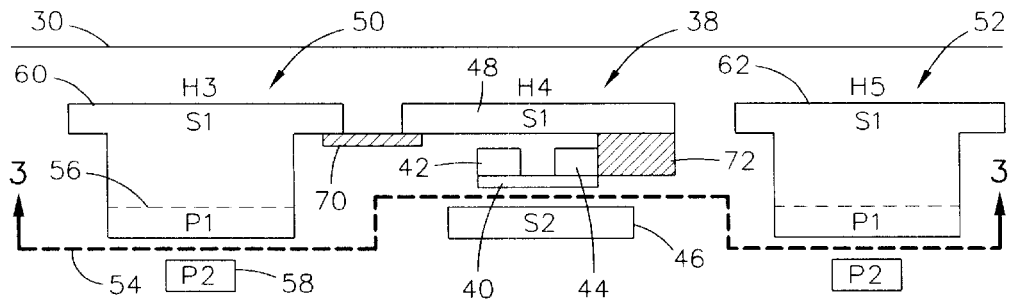
FIG. 2 illustrates a cutaway portion of the MR head assembly from FIG. 1 expanded to illustrate the features of the interleaved thin-film read and write gap shield-couplings of this invention.

FIG. 2 shows in detail a portion of substrate 30 from FIG. 1, including portions of three exemplary R/W head gaps on head-gap line 26, which are aligned with track-pairs H3–H5 substantially as shown. The thin-film elements shown in FIG. 2 are illustrated showing submicron detail in the usual manner and are not to scale. Considering first the read-head 38 at track-pair H4, a magnetoresistive (MR) sensor element 40 is disposed between the two MR element (S2 & S1) shields 46 and 48, with each MR sensor end coupled to an electrical lead conductor 42 and 44. The relative disposition of electrical lead conductors 42–44 may be better appreciated with reference to FIG. 3, which illustrates a semi-transparent cross-sectional view of substrate 30 from FIG. 2 taken along section line 3—3.

In FIG. 2 (not to scale), read head 38 is seen to be disposed between the two write heads 50 and 52 positioned for writing data on track-pairs H3, H5, each adjacent to track-pair H4, substantially as shown. Write head 52 is substantially identical to write head 50, which includes a write-gap 54 defined by two spaced magnetic pole (P1 & P2) tips 56 and 58 wherein the pole tip 56 is a lower component of a pole piece and 60 represents an upper component of the pole piece. The upper pole piece component 60 may be deposited using the same material and deposition cycle as MR element S1 shield 48 to improve manufacturability.

Figure 3:
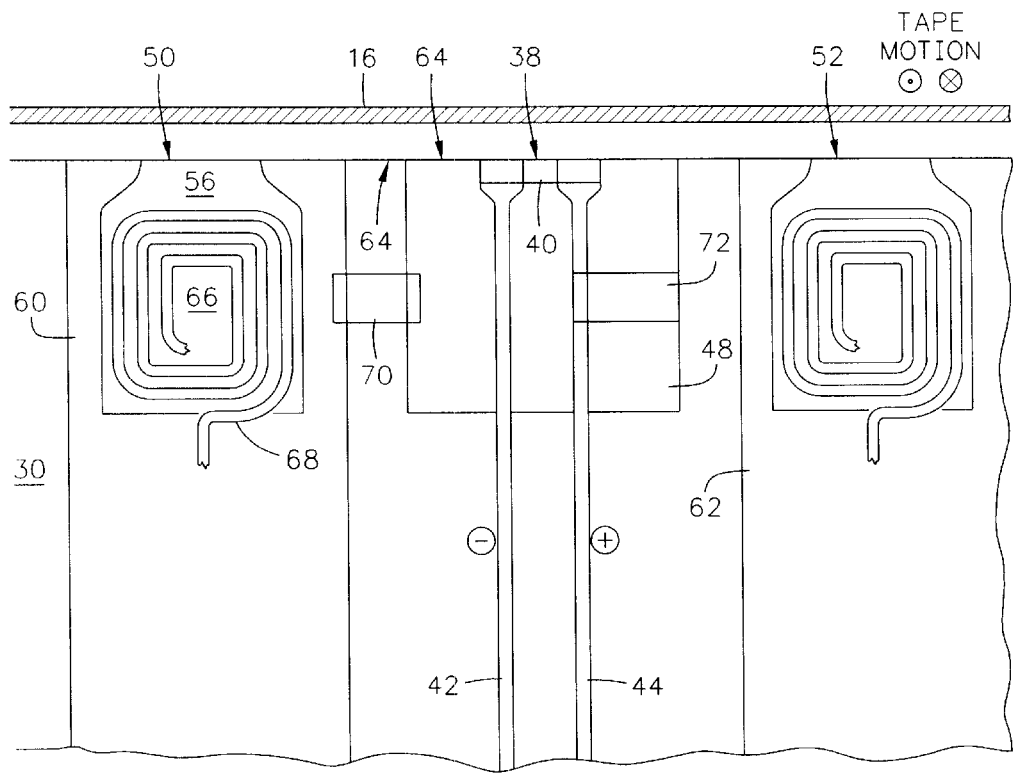
FIG. 3 illustrates a cross-sectional view of the MR head assembly from FIG. 2 taken along 3—3 with insulation between the layers removed.

Referring also to FIG. 3, magnetic tape medium 16 is illustrated in cross-section and shown adjacent the air bearing surface (ABS) 64 of substrate 30 and interleaved MR head assembly 10 (FIG. 1). The direction of motion of magnetic tape medium 16 is perpendicular to the page, as indicated by the oncoming and retreating arrow symbols. FIG. 3 shows in semi-transparent cross-section the relative planar view of some elements of interest, particularly the back-gap portion 66 of magnetic pole P1 piece 56 where it is joined to the back gap portion of the other magnetic pole P2 piece 58 (see FIG. 2) to complete the magnetic circuit energized by the write-coil 68 in the usual manner.

In accordance with this invention, as schematically illustrated in FIGS. 2–3, an electrical connection 70 is established between the electrically-conductive MR element S1 shield 48 and the immediately-adjacent upper pole piece component 60 (and thereby to magnetic pole tip P1). Electrical connection 70 is established for each laterally-adjacent R/W head pair along head-gap lines 26 and 28 (FIG. 1) and is implemented in FIG. 2 by the electrical conductor 70, which is merely one of many useflul means for conductively coupling the shield 48 and the pole piece which has upper and lower components 56 and 60. In accordance with this invention, the electrical connection exemplified by electrical conductor 70 is made independently for each reader-writer pair along both head-gap lines 26 and 28 of substrates 30 and 32 (FIG. 1). Electrical conductor 70 (FIGS. 2–3) is preferably non-magnetic and may be formed by depositing a layer of conductive metal, such as tantalum, copper or gold, or any other useful material of low to intermediate resistivity. Electrical conductor 70 may, for example, have a resistance in the range from about 5 kilohms to about 50 kilohms or more.

Figures 4A, 4B:
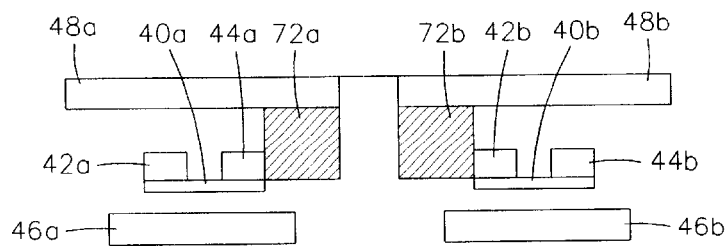
FIGS. 4A–4B illustrate expanded views of alternative exemplary embodiments of the thin-film read gap of this invention showing the MR shield charge-clamping layer.

According to this invention, within each read head, which is exemplified by read head 38, MR element shield 48 is also connected by means of an electrical conductor 72 to one of electrical lead conductors 42–44, preferably the most positively-biased of the two (shown as electrical lead conductor 44 in FIG. 3). FIGS. 2–3 show this connection between MR element shield 48 and electrical lead conductor 44, for example. FIGS. 4A and 4B illustrate this charge-clamping connection in the alternative. FIG. 4A shows MR element shield 48a clamped to electrical lead conductor 44a by means of the electrical conductor 72a. Similarly, according to FIG. 4B, MR element shield 48b is connected through the electrical conductor 72b to electrical lead conductor 42b. The fabrication and operation of electrical conductor 72a-b may be better appreciated with reference to the commonly-assigned U.S. Pat. No. 6,246,553 incorporated herein by reference.

In operation, the presence of electrical conductor 70 and electrical conductor 72 clamps the electrical potential of the upper and lower pole piece components 60 and 56 to that of MR element shield 48, which is clamped to the voltage potential of MR electrical lead conductor 42 (or 44). This arrangement forces the voltage potentials to be the same for both write and read heads 50 and 38, thereby reducing the differences in wear between the two adjacent R/W heads 38, 50. By equalizing the electrical environment over adjacent heads, the erosion of the wear-resistant alumina surface and other related component is equalized. This occurs because any such wear arising from electrically-enhanced alumina erosion is equalized. Sputtered alumina is known to be less wear-resistant in acidic and basic environments, such as in conjunction with the head-tape interface at ABS 64, than in neutral environments. The inventor has shown that this conjectured chemical-mechanical mechanism appears to be influenced by the local electrical environment, which is controlled in the interleaved MR head assembly of this invention by equalizing the robustness of the write heads and the read heads.

Figure 5:
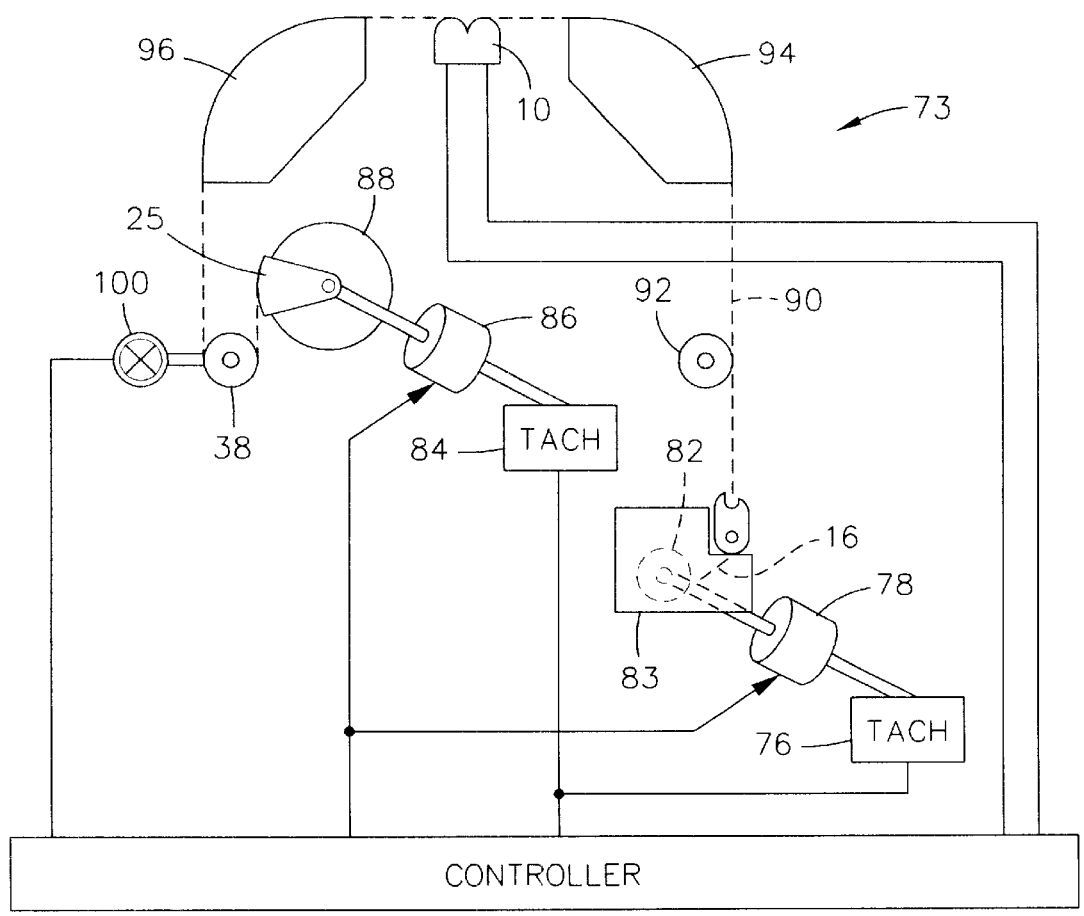
FIG. 5 illustrates a schematic diagram of a magnetic tape drive useful with the magnetic head assembly of this invention.

FIG. 5 shows a schematic diagram of a magnetic tape drive 73 useful with magnetic head assembly 10 of this invention discussed above in connection with FIG. 14. The controller 74 accepts information from a supply reel tachometer 76, which is coupled to a supply reel motor 78, which is controlled by controller 74 to reversibly rotate a supply reel 82 shown within a single supply reel cartridge 83. A take-up reel tachometer 84 is connected to a take-up reel motor 86 that is reversibly driven by controller 74. Take-up reel motor 86 drives a take-up reel 88. Magnetic tape 16 and its leader block moves along a path shown by the dotted line 90, from supply reel 82 past an idler bearing 92, the air bearing tape guides 94 and 96, continuing around a roller 98 coupled a tension arm transducer 100 under the control of controller 74, and therefrom to take-up reel 88., substantially as shown. The resulting output from the read elements in MR head assembly 10 is transmitted to controller 74, which also directs data from an external source to head assembly 10 for transfer onto tape medium 16 through the plurality of write elements in MR head assembly 10. Magnetic tape drive 73 may be generally of the one-half inch type having a single reel cartridge. As is well-known in the tape drive industry, other media formats are also available for example, quarter-inch cartridge (QIC), digital linear tape (DLT), digital analog tape (DAT), and the like.

While the interleaved MR head assembly 10 of this invention is primarily suitable for data tape recording applications, the same fabrication principles could be applied to making a magnetic R/W head assembly for other magnetic recording applications. Disk drive applications generally use merged or piggy-back R/W heads that are less troubled with head wear problems and unlikely to need the improvement of this invention.

Figure 6:
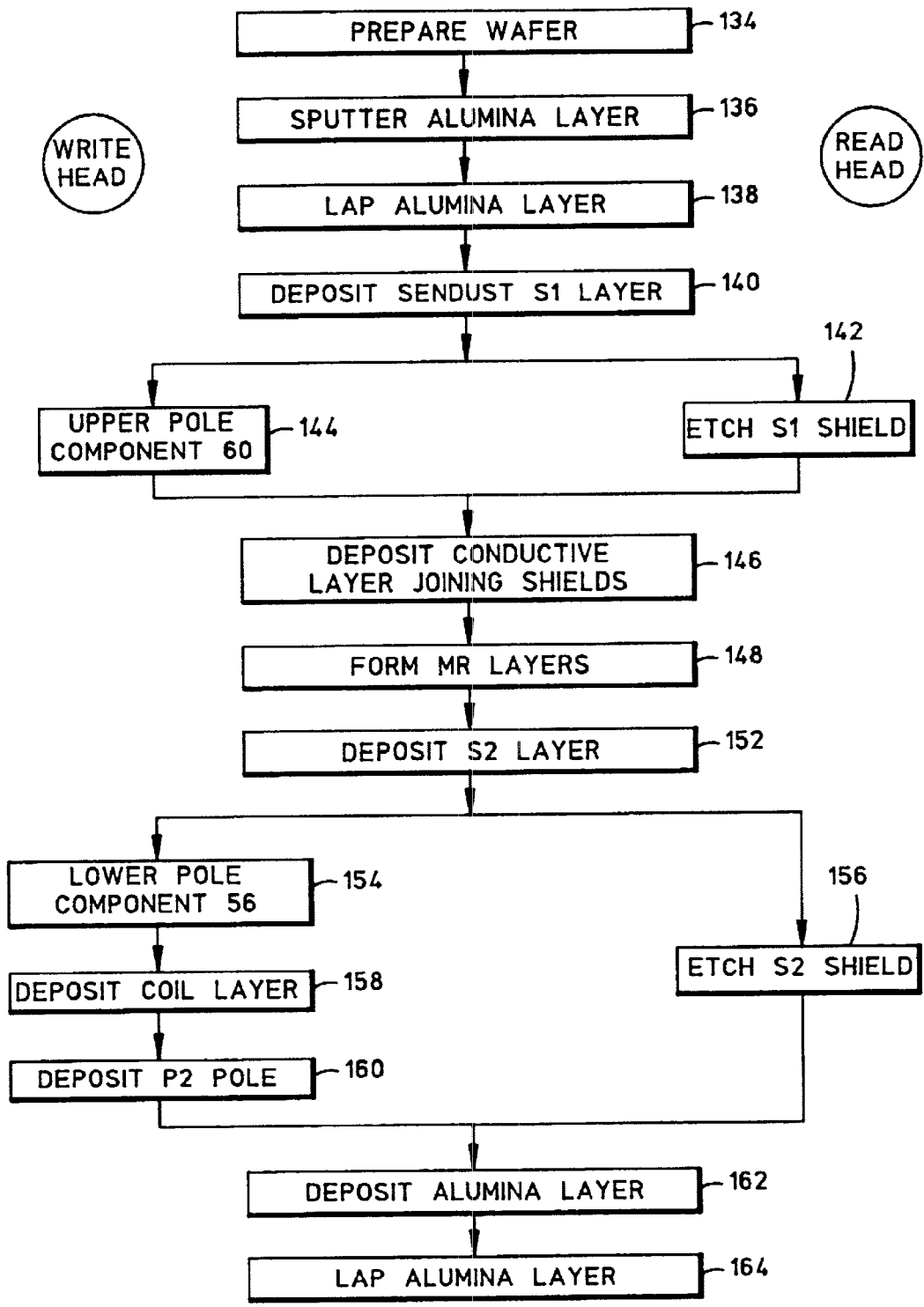
FIG. 6 is a block diagram illustrating a preferred embodiment of the method of this invention for fabricating a magnetic head assembly.

FIG. 6 provides a block diagram illustrating a preferred method for fabricating a magnetic head assembly in accordance with the MR head assembly method of this invention. For expository purposes, the diagram in FIG. 6 is shown in sections, with the left column showing steps for forming the write element plurality, the right column showing steps for forming the read element plurality, and the middle column showing steps common to both. In practice, these processes are performed concurrently so that both read and write elements are formed as much as possible in the same process steps. The following exemplary description is limited to a single adjacent write-read pair, from which the process may be easily appreciated. In forming the plurality of read and while elements, the first step 134 prepares the surface of wafer substrate 30 (FIG. 1). At the step 136, the insulating alumina undercoat layer 35 (FIG. 1) is sputtered onto the surface of substrate 30. At the step 138, the surface of alumina undercoat layer 35 is lapped to a thickness of 3–4 microns. This provides a flat surface for deposition of the first Sendust S1 layer at the step 140, which is patterned to create MR element S1 shield 48 at the stop 142 and the upper pole piece component 60 at the step 144 (FIGS. 2–3). Thereafter, in the step 146, electrical conductor 70 is formed to couple upper S1 MR shield 48 to upper pole piece component 60. The several layers making up the MR sensor, including MR sensor element 40, electrical lead conductors 42 and 44 and the embracing insulating layers, are deposited and etched in the step 148. The S2 layer deposition in the step 152 is made directly over upper pole piece component 60 to join it to the lower P1 tip 56, which is patterned in the step 154. The step 156 patterns MR element 52 shield 46. The step 158 deposits write-coil 68 in the usual manner (FIG. 3) and the step 160 deposits magnetic pole 22 tip 58. Not shown are the various patterning steps required to complete the magnetic closure in back gap portion 66 between the magnetic pole P1 & P2 layers. Also not shown are the steps required to connect at least one and preferably both read gap shields to one of the MR signal leads (preferably the lead having the most positive potential) or to both MR leads via a center-tapped resister clamping structure. This process is fully described in the commonly-assigned U.S. Patent No. 6,246,553 incorporated herein by reference. Finally, a covering alumina layer is sputtered in the step 162 and lapped in the step 164 to form overlayer 39 (FIG. 1).

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A magnetic head assembly having a head surface; comprising:
    a read head including:
        a magnetoresistive (MR) sensor element having opposite ends each connected to a respective electrical lead conductor, the MR sensor element and two electrical lead conductors being disposed in spaced relationship between first and second MR element shields;
        a first electrical conductor coupling said first MR element shield and at least one of the electrical lead conductors;
    a write head including:
        two magnetic pole pieces each having a pole tip portion disposed adjacent the ABS;
        each pole piece being a separate component and being laterally spaced from each of said MR element shield along said head surface in a direction normal to a flux transfer between the pole pieces; and
        a write gap located between the pole tip portions; and
    a second electrical conductor coupling said first MR element shield and one of the pole tip portions.

2. The assembly of claim 1 wherein the electrical conductors consist essentially of one or more materials chosen from the group tantalum, copper and gold.

3. A magnetic tape drive including at least one magnetic head assembly that has an air bearing surface (ABS) and that includes a write head and a read head, comprising:
    a magnetic recording medium having a recording surface;
    a motor for moving the magnetic recording medium;
    a head-mount assembly for supporting the magnetic head assembly with respect to the magnetic recording medium;
    the read head including:
        a magnetoresistive (MR) sensor element having opposite ends each connected to a respective electrical lead conductor, the MR sensor element and the two electrical lead conductors being disposed in spaced relationship between first and second MR element shields;
        a first electrical conductor coupling said first MR element shield and at least one of the electrical lead conductors;
    a write head including:
        two magnetic pole pieces each having a pole tip portion disposed adjacent the ABS;
        each pole piece being a separate component and being laterally spaced from each of said MR element shield along said head surface in a direction normal to a flux transfer between the pole pieces; and
        a write gap located between the pole tip portion; and
    a second electrical conductor coupling said first MR element shield and one of the pole tip portions.

4. The assembly of claim 3 wherein the electrical conductors consist essentially of one or more materials chosen from the group of tantalum, copper and gold.

5. A method for making a magnetic head assembly that has a head surface, comprising the unordered steps of:

forming a magnetoresistive (MR) sensor element with opposite ends each connected to a respective electrical lead conductor and with the MR sensor element and the two electrical lead conductors disposed in spaced relationship between first and second MR element shields, forming a first electrical conductor coupling, said first MR element shield and at least one of the electrical lead conductors;

making a write head including the steps of:
  forming two magnetic pole pieces with each pole piece having a pole tip portion disposed adjacent the ABS;
  forming each pole piece as a separate component and laterally spaced from each of said MR element shield along said head surface in a direction normal to a flux transfer between the pole pieces; and
  forming a write gap between the pole tip portions; and forming a second electrical conductor coupling said first MR element shield and one of the pole tip portions.

6. The method of claim 5 wherein the electrical conductors formed of one or more materials chosen from the group consisting of tantalum, copper and gold.

7. A magnetic head assembly comprising:

a substrate which is elongated along a longitudinal axis;

a plurality of read and write heads;

the read and write heads being mounted on the substrate in an alternating read and write head relationship along an axis which is parallel to said longitudinal axis;

the read head including:
  a sensor which has first and second side edges;
  first and second leads connected to the first and second side edges respectively;
  ferromagnetic first and second shield layers;
  the sensor and the first and second lead layers being located between the first and second shield layers;

the write head being adjacent said read head along said axis end including:
  first and second pole tips which are separate components relative to the first and second shield layers and which are laterally spaced from each of said first and second shield layers along a head surface in a direction normal to a flux transfer between the first and second pole tips;
  a write gap layer separating the first and second pole tips; and
  a conductor structure connecting one of the first and second leads to one of the first and second pole tips.

8. A magnetic head assembly as claimed in claim 7 including:

said conductor structure including first and second conductors; and the first conductor connecting one of the first and second lead layers to the second shield layer and the second conductor connecting the second shield layer to said one of the first and second pole tips.

9. A magnetic head assembly as claimed in claim 8 including:

said plurality of read and write heads including a plurality of read heads and a plurality of write heads;

the plurality of read heads and the plurality of write heads being mounted on the substrate in said alternating read and write head relationship along said axis; and additional conductor structure connecting additional ones of the first and second leads to additional ones of the first end second pole tips of additional adjacent read and write heads of said plurality of read heads and plurality of write heads.

10. A method of making a magnetic head assembly comprising the steps of:

forming a substrate which is elongated along a longitudinal axis;

forming a plurality of read and write heads;

forming the read and write heads on the substrate in an alternating read and write head relationship along an axis which is parallel to the longitudinal axis;

a making of the read head including the steps of:
  forming a sensor which has first and second side edges,
  connecting first and second leads to the first and second side edges respectively;
  forming ferromagnetic first and second shield layers;
  forming the sensor and the first and second lead layers between the first and second shield layers;

forming a write head adjacent said read head along said axis comprising the steps of:
  forming first and second pole tips which are separate components relative to the first and second shield layer and which are laterally spaced from each of said first and second shield layers along a head surface in a direction normal to a flux transfer between the first and second pole tips;
  forming a write gap layer separating the first and second pole tips; and
  forming a conductor structure connecting one of the first and second leads to one of tip first and second pole tips.

11. A method as claimed in claim 10 including the steps of:

forming said conductor structure with first and second conductors; and forming the first conductor connecting one of the first and second lead layers to the second shield layer and forming the second conductor connecting the second shield layer to said one of the first and second pole tips.

12. A method as claimed in claim 11 including the steps of:

said plurality of read and write heads being formed as a plurality of read heads and a plurality of write heads;

forming the plurality of read heads and the plurality of write head on the substrate in said alternating read and write head relationship along said axis; and forming additional conductor structures connecting additional ones of the first and second leads to additional ones of the first and second pole tips of additional adjacent read and write heads of said plurality of read heads and plurality of write heads.

* * * * *